Nov. 8, 1932.   H. NEUWIRTH   1,887,064
COMBINATION SUN WATCH DIAL AND COMPASS
Filed June 27, 1931
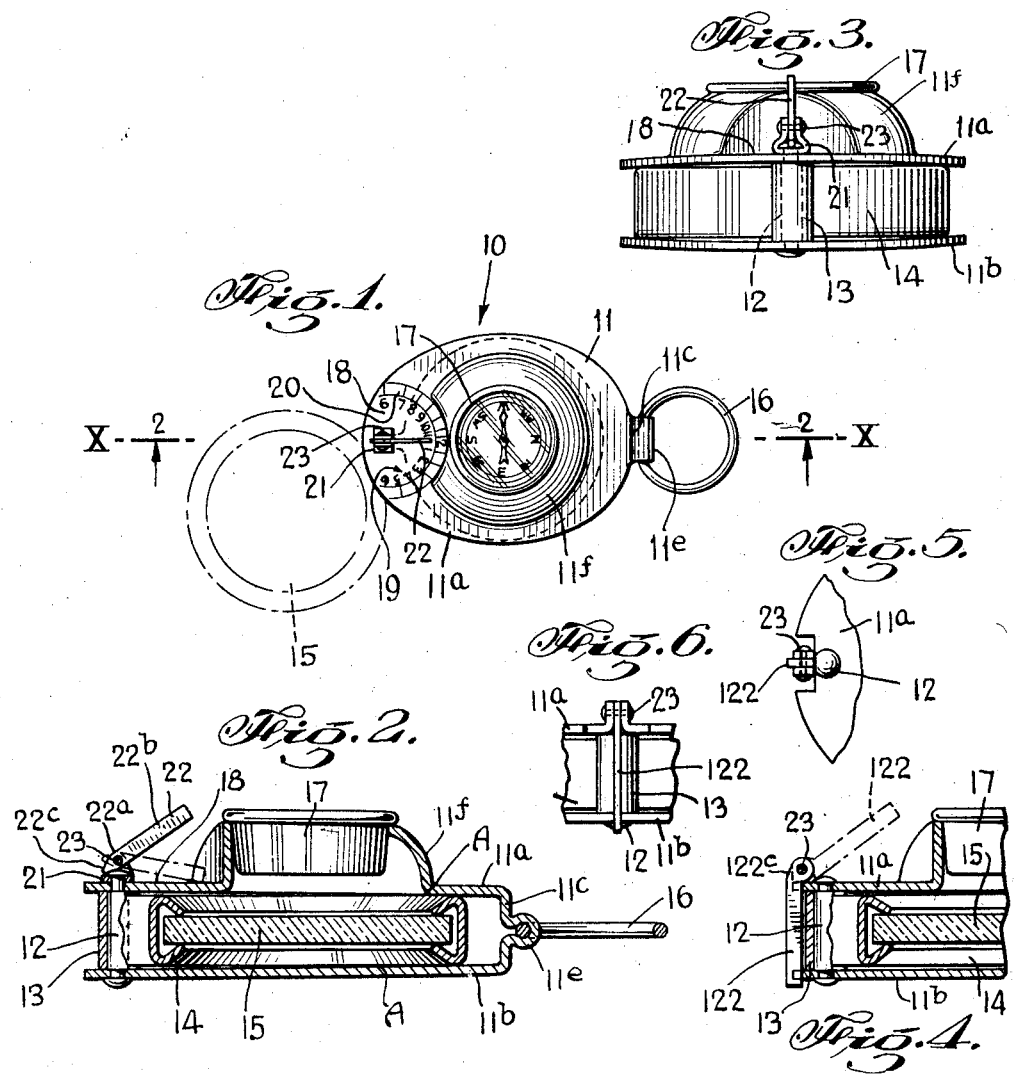
INVENTOR
*Herman Neuwirth*
BY
*Louis Barnett*
ATTORNEY Patented Nov. 8, 1932

1,887,064

UNITED STATES PATENT OFFICE

HERMAN NEUWIRTH, OF NEW YORK, N. Y.

COMBINATION SUN WATCH DIAL AND COMPASS

Application filed June 27, 1931. Serial No. 547,237.

This invention relates to sportsmen's and boy scouts' accessories and more particularly is directed to an improved construction of combination pocket, burning and magnifying glass, compass and sun-watch.

Among the objects of the invention is to generally improve the construction of accessories of the character described which shall comprise few and simple parts assembled to form a neat appearing rugged structure capable of withstanding hard and rough usage and which shall be cheap to manufacture, and practical and efficient to a high degree in use.

Other objects of this invention will in part be obvious and in part hereinafter pointed out.

The invention accordingly consists in the features of construction, combinations of elements and arrangement of parts which will be exemplified in the constructions hereinafter described and of which the scope of application will be indicated in the following claims.

In the accompanying drawing, in which is shown various possible illustrative embodiments of this invention:

Fig. 1 is a top plan view of a combination pocket, burning magnifying glass and compass and sun-watch constructed to embody the invention, in dot and dash lines, the magnifying glass being shown swung out of the housing.

Fig. 2 is a cross-sectional view taken on lines 2—2 in Fig. 1.

Fig. 3 is an end elevational view as seen in the direction of the arrows 3—3 in Fig. 2.

Fig. 4 is a fragmentary side elevational view in section showing a modified mounting for the gnomon, and Figs. 5 and 6 are top and end elevational views of the gnomon mounting shown in Fig. 4.

Referring in detail to the drawing, 10 denotes an accessory in the form of a combination pocket, burning and magnifying glass compass and sun-watch embodying the invention such as used by sportsmen and boy scouts. The device 10 is seen to comprise a housing 11 of any suitable construction and as here shown, is formed of a single flat sheet folded on itself to provide a U-shaped structure having an upper and lower portion 11a and 11b, respectively, said portions being positioned in superimposed spaced relation as shown in Figs. 2 and 3. Said housing may preferably be made of a resilient metal stamping having a nickel or gilt surface finish.

The portions 11a and 11b are interconnected at one end of the housing by an integrally formed mid-portion 11c, the free ends of said portions 11a and 11b may be drilled or punched with aligned holes in which opposite ends of a pin 12 are secured. Said pin 12 serves as a pivoting shaft for a bearing lug 13 extending from a frame 14. The latter carries a lens or magnifying glass 15, in any suitable well understood manner. The magnifying glass 15 may be circular in shape and the portions 11a and 11b may each have an elliptical contour so as to form a close fitting casing for the magnifying glass 15 and its frame 14 when swung into the housing as is clearly shown in Figs. 1 and 2. The mid portion 11c of the housing preferably terminates in a loop or ring 11e which links with a bail 16, the latter serving to suspend the device from a cord or chain (not shown) for attaching to a person's wearing apparel.

The upper portion 11a may be formed with a central upwardly extending boss 11f having a perforation or opening which forms a socket in which is securely fitted a compass element 17 of any conventional construction. The bearing lug 13 is preferably made the same thickness as the frame 14 or slightly thicker than the latter so that normally said frame 14 can be readily swung in and out of the housing. In order to retain the frame 14 in its enclosed position within the housing 11, the lower and upper portions 11a and 11b with the folded mid-portion 11c are made to form a resilient structure for frictionally engaging the frame, said portions 11a and 11b providing a spring clamp means, as at A between the ends of the housing as shown in Fig. 2.

The upper portion 11a may be formed with a flat circular shaped section 18, the boss 11f being discontinued so that said section serves as a dial. The latter may be engraved, printed, embossed or stamped with numerals 19 corresponding to the sun light hour. Said numerals are positioned to indicate the spaced radial shadow marker lines 20 which may also be engraved, printed, stamped or embossed on the dial section 18.

On one end of the pin 12, a yoke or bifurcated attachment piece 21 is permanently secured, and a gnomon 22 is pivoted by one end 22a thereof as at 23 to said yoke 21. With the dial section 18 in a horizontal plane, the upper straight edge 22b of the gnomon is adapted when inclined to the dial surface of the circular shaped section 18 (shown in full lines in Fig. 2) to cast a shadow for co-operating with the marker lines 20 and numerals 19 to indicate the time during sunlight hours in the well understood manner. As shown in Fig. 1, the gnomon 22 is positioned in a plane X—X and the shadow line marked "12" on the dial section 18 is set in alignment with the direction from the north (N) to the south (S) pole of said compass element. The gnomon end 22a may have an extension stop 22c to limit the swinging movement of the gnomon 22 whereby the gnomon is located to correspond to a normal latitude, as for example, 40 to 45 degrees.

The practical utility of the invention will now be apparent. After the parts have been assembled as shown in Figs. 1, 2 and 3, the device 10 with the frame 14, magnifying glass 15 and gnomon 22 positioned (as shown in Fig. 2), forms a compact body which can be readily carried in the pocket or attached to a chain, cord or keyring by means of the bail 16, the compass element 17 being available for use in the well understood manner. To use the lens 15 as a magnifying or burning glass, the frame 14 is simply swung out of the housing 11 on the pivoting shaft 12. While the frame 14 is enclosed in the housing 11, the portions 11a and 11b frictionally engage the frame 14 and retain the burning or magnifying glass against accidental swinging movement out of said enclosed position yet give ready access thereto.

To use the device 10 as a sun-watch, the dial on the section 18 is brought into a level position in a horizontal plane and is turned until the needle of the compass points north (N) so as to bring the gnomon 22 in the plane of the earth's meridian. The edge 22b of the gnomon when the latter is in its effective inclined position (shown in full lines in Fig. 2), will cast a shadow on the dial during sunlight hours. After reading the time on the numerals 19, the gnomon 22 may be swung down against the dial section, (as shown in dotted lines in Fig. 2).

In Figs. 4, 5 and 6, a modified form of the gnomon mounting is shown. Here the gnomon 122 is collapsed by swinging the same over the outer end of the portions 11a and 11b and may be swung upwardly in an effective inclined position with respect to the dial portion 18. A suitable abutment stop 122c may be provided to definitely position the gnomon 122 for normal use at the latitude of 40 to 45 degrees.

It will thus be seen that there is provided a device whereby the several objects of this invention are achieved and which are well adapted to meet the conditions of practical use.

As various possible embodiments might be made of the above invention, and as various changes might be made in the embodiments above set forth, it is to be understood that all matter herein set forth or shown in the accompanying drawing is to be interpreted as illustrative and not in a limiting sense.

Having thus described my invention, I claim as new and desire to secure by Letters Patent:

1. In a device of the class described, the combination with a housing, of a supporting member at one end of said housing, a boss rising from the top side of said housing, a compass seated within a depression in the top side of said boss, and a sun watch mounted on the top side of said housing in juxtaposition to said boss and compass, said sun watch having a portion of its dial overlapping an adjacent wall portion of the boss to dispose the center of the arc of the said dial portion in substantially close proximity to an adjacent side of said compass.

2. The device as set forth in claim 1, wherein the said boss has a depression formed in its side wall and a portion of the dial of the said sun watch is extended inwardly thereof to dispose it in substantially close proximity to the adjacent side of the said compass.

In testimony whereof I affix my signature.

HERMAN NEUWIRTH.